United States Patent

Wu

[11] Patent Number: 5,553,654
[45] Date of Patent: Sep. 10, 1996

[54] SUNSHIELDING CURTAIN

[76] Inventor: Hans Wu, 2F, No. 2, Alley 97, Lane 226, Sec. 3; Tung-Men Rd., Tainan, Taiwan

[21] Appl. No.: 273,502
[22] Filed: Jul. 11, 1994
[51] Int. Cl.$^6$ ...................................... B60J 9/00
[52] U.S. Cl. ................. 160/370.21; 160/DIG. 13
[58] Field of Search ............. 160/370.21, DIG. 2, 160/DIG. 3, DIG. 13, 368.1, 354, 327; 296/97.7, 97.8, 97.9

[56] References Cited

U.S. PATENT DOCUMENTS

| | | | |
|---|---|---|---|
| 2,608,250 | 8/1952 | Meyer | 160/DIG. 13 X |
| 2,722,978 | 11/1955 | Frisk | 160/DIG. 2 X |
| 2,843,421 | 7/1958 | Shelton | 160/320.21 X |
| 4,749,222 | 6/1988 | Idland | 160/370.21 X |
| 4,862,944 | 9/1989 | Hendershot | 160/370.21 X |
| 5,121,957 | 6/1992 | O'Shea | 160/370.21 X |
| 5,165,462 | 11/1992 | Kang | 160/370.21 |
| 5,379,822 | 1/1995 | Lenetz | 160/370.21 |

Primary Examiner—David M. Purol
Attorney, Agent, or Firm—Harness, Dickey & Pierce, P.L.C.

[57] ABSTRACT

The sunshielding curtain includes a sunshielding sheet and a pressure sensitive adhesive sheet attached to the sunshielding sheet and having an interior face lying against the sunshielding sheet and an exterior face opposite the interior face. The pressure sensitive adhesive sheet has a plurality of separate concave portions on the exterior face. The interior face is fixed to the sunshielding sheet at positions corresponding to the separated concave portions.

6 Claims, 4 Drawing Sheets

SUNSHIELDING CURTAIN

BACKGROUND OF THE INVENTION

1. Field of the Invention

The invention relates to a sunshielding curtain, more particularly to a sunshielding curtain which can be retained adheringly and effectively on a vehicle window.

2. Description of the Related Art

Sunshielding curtains are usually installed on the window of a vehicle in order to prevent the build-up of high temperatures in the vehicle when the latter is parked for a relatively long period under the sun. Referring to FIG. 1, a conventional sunshielding curtain 1 is shown to include a storage casing 10 provided with two hanging hooks 11, a sunshade sheet 2 received retractably within the casing 10, and a suction cup 3 attached to a distal end of the sunshade sheet 2. In use, the hanging hooks 11 are attached to a window frame, and the sunshade sheet 2 is pulled outwardly from the storage casing 10. The suction cup 3 is then pressed against a glass panel of the vehicle window so as to retain the sunshade sheet 2 at an extended position.

It is noted that the suction cup 3 may deform when exposed to high temperatures for a relatively long period of time. When deformed, the suction cup 3 is unable to retain the sunshade sheet at the extended position, thereby causing the sunshade sheet 2 to retract into the storage casing 10.

Referring to FIG. 2, another conventional sunshielding curtain is shown to include a nylon net sunshade 4 and two spaced mounting strips 5 attached respectively on two distal edge portions of the nylon net sunshade 4. Note that each of the mounting strips 5 is made of a plastic cling material and has a first face adhered on the nylon net sunshade 4 by means of a known hot pressing method along opposed peripheral edge portions 51, 52 of the mounting strips 5. Referring to FIG. 3, when mounting the conventional sunshielding curtain of FIG. 2 on the glass panel of a vehicle window, the mounting strips 5 are pressed against the glass panel 6 so that the mounting strips 5 can adhere thereto. Since the opposed peripheral edge portions 51, 52 of the mounting strips 5 are heat-pressed to the nylon net sunshade 4, the portions 51, 52 of each mounting strip 5 are incapable of adhering effectively with the glass panel 6.

Furthermore, each of the mounting strips 5 is adhered to the glass panel 6 by longitudinal and continuous adhesion areas. In the event that a portion of any of the continuous adhesion areas is interrupted, such as due to the entrapping of a particle which results in a space between the continuous adhesion area and the glass panel, the adhesive power of entire adhesion area is consequently decreased, thus consequently leading to the untimely removal of the sunshielding curtain from the glass panel 6.

SUMMARY OF THE INVENTION

A main object of the present invention is to provide a sunshielding curtain which can generate a high suction force so that the sunshielding curtain does not easily fall off from an adhered surface.

A second object of the present invention is to provide a sunshielding curtain which has a plurality of separate suction portions so that the sunshielding curtain of the present invention can adhere effectively on an adhered surface and the suction force of the separate suction portions is not affected due to the disengagement of an individual suction portion from the adhered surface.

Accordingly, a sunshielding curtain of the present invention includes a sunshielding sheet and a pressure sensitive adhesive sheet attached to the sunshielding sheet. The pressure sensitive adhesive sheet is formed with an interior face that lies against the sunshielding sheet and an exterior face opposite to the interior face. The pressure sensitive adhesive sheet has a plurality of separate concave portions on the exterior face and the interior face of the adhesive sheet is fixed on the sunshielding sheet at positions corresponding to the separate concave portions.

In the preferred embodiment, the sunshielding curtain includes two pressure sensitive adhesive sheets, each of which is attached along one of a pair of opposed edges of the sunshielding sheet. Each of the pressure sensitive adhesive sheets has a central line parallel to the edge of the sunshielding sheet. The concave portions are aligned along the central line such that adjacent ones of the concave portions are displaced at a certain interval.

The sunshielding sheet is preferably made of a plurality of interwoven polyester or nylon threads which have a plurality of openings among the threads. The front face of the sunshielding sheet which is to be exposed to the sunlight and is preferably coated with a layer of light-reflecting paint. The pressure sensitive adhesive sheet is preferably made of plastic cling material with pressure sensitive adhesive characteristics, such as vinyl plastic material.

When the pressure sensitive adhesive sheet is pressed against the glass panel of a vehicle window, each of the separate concave portions serves as a suction cup which adheres strongly to the glass panel. Thus, the sunshielding curtain of the present invention generates a strong suction force and therefore does not easily fall from the glass panel.

BRIEF DESCRIPTION OF THE DRAWINGS

Other features and advantages of the present invention will become more apparent in the following detailed description of the preferred embodiment with reference to/the accompanying drawings, in which.

DETAILED DESCRIPTION OF THE PREFERRED EMBODIMENT

Figure 2:
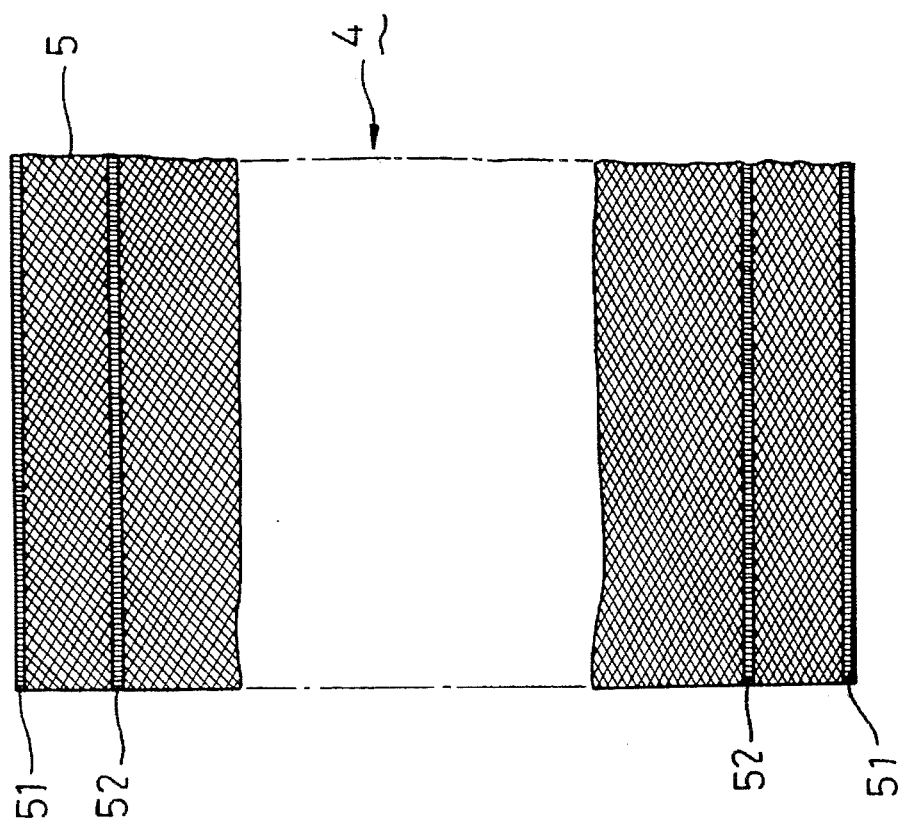
FIG. 2 shows another conventional sunshielding curtain.
Figure 1:
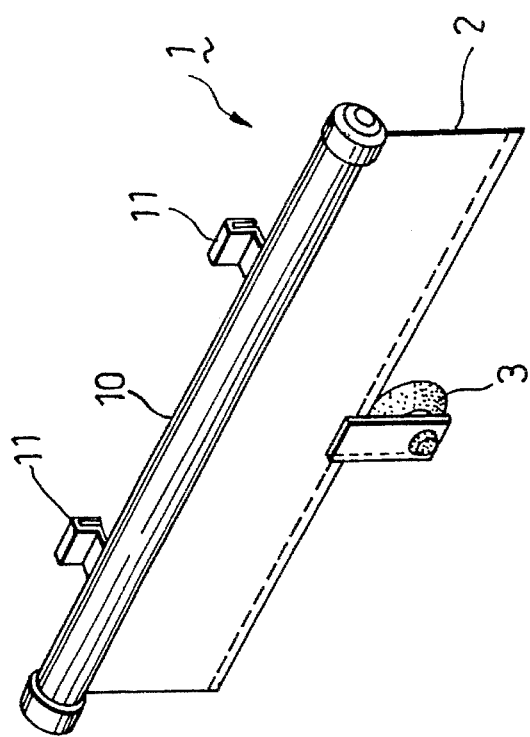
FIG. 1 shows a conventional sunshielding curtain.
Figure 3:
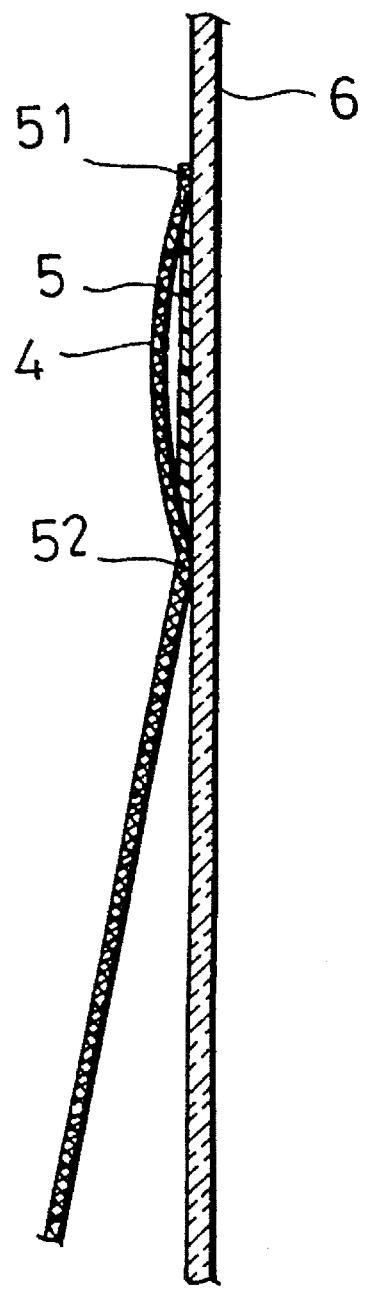
FIG. 3 illustrates the conventional sunshielding curtain of FIG. 2 when in use.
Figure 4:
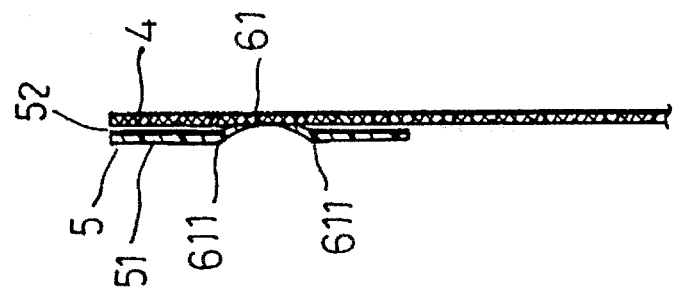
FIG. 4 shows a side view of the sunshielding curtain of the present invention.

Referring to FIG. 4, the preferred embodiment of a sunshielding curtain of the present invention is shown to comprise a sunshielding sheet 4 and two pressure sensitive adhesive sheets 5. To facilitate explanation of the present invention, only one of the pressure sensitive adhesive sheets 5 will be described in the following paragraphs.

The sunshielding sheet 4 is a net member which is made of a plurality of interwoven polyester or nylon threads with a plurality of openings among the threads. A front face of the sunshielding sheet 4 that is to be exposed to the sunlight and is coated with a layer of light-reflecting paint after undergoing a known electrostatic treatment.

Each of the pressure sensitive adhesive sheets 5 is an elongated strip made of a plastic cling material with pressure sensitive adhesive characteristics, such as transparent vinyl plastic. The pressure sensitive sheet 5 has an exterior face 51 which is provided with a plurality of separate concave portions 61,62, 63, and an interior face 52 opposite the exterior face 51. The pressure sensitive adhesive sheet 5 is attached to the sunshielding sheet 4 by applying adhesives on the interior face 52 or by hot pressing from the exterior face 51 such that the interior face 52 of the pressure sensitive adhesive sheet 5 is fixed to the sunshielding sheet 4 at positions corresponding to the separate concave portions 61, as shown in FIG. 4.

Figure 5:
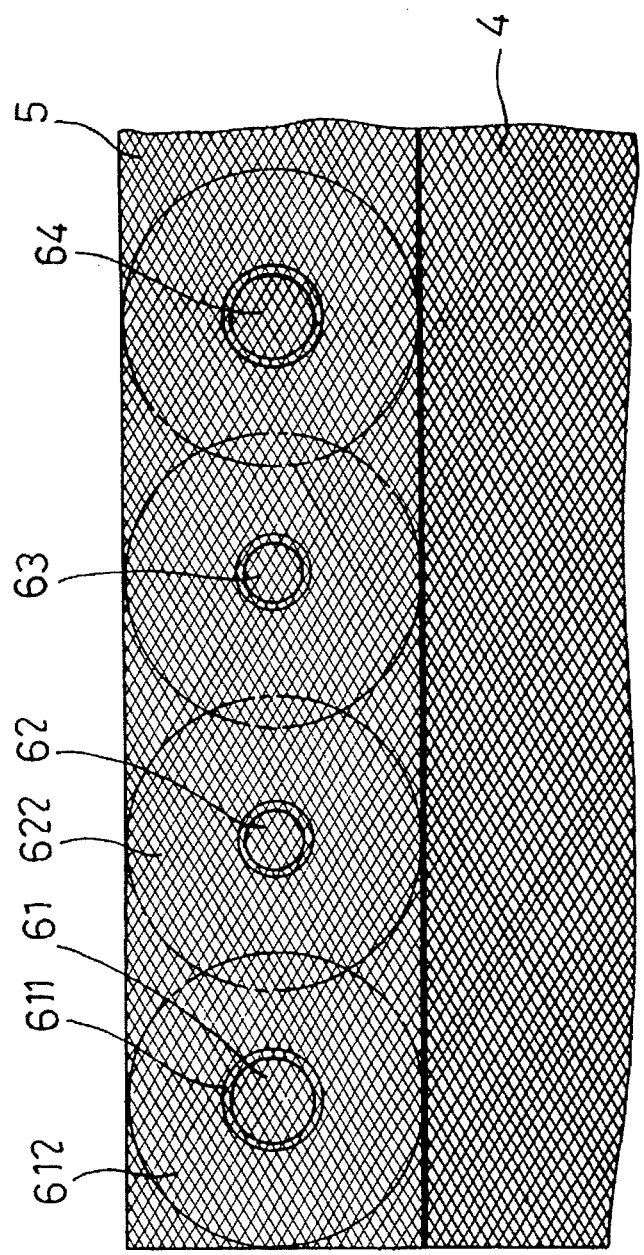
FIG. 5 illustrates the sunshielding curtain of the present invention when in a stretched condition.

Referring to FIG. 5, adjacent ones of the concave portions 61, 62, 63 of the pressure sensitive adhesive sheet 5 employed in the embodiment are displaced at a certain interval. The concave portions 61, 62, 63 have aligned center points which form a central line that is parallel to the peripheral edge of the sunshielding sheet 4. The concave portions 61, 62, 63 may have different sizes. When the pressure sensitive adhesive sheet 5 is heat-pressed to the sunshielding sheet 4, the periphery of each of the concave portions 61, 62, 63 is consequently curved to form an annular flange 611 around the same, thus forming an effective suction area theraround.

Figure 6:
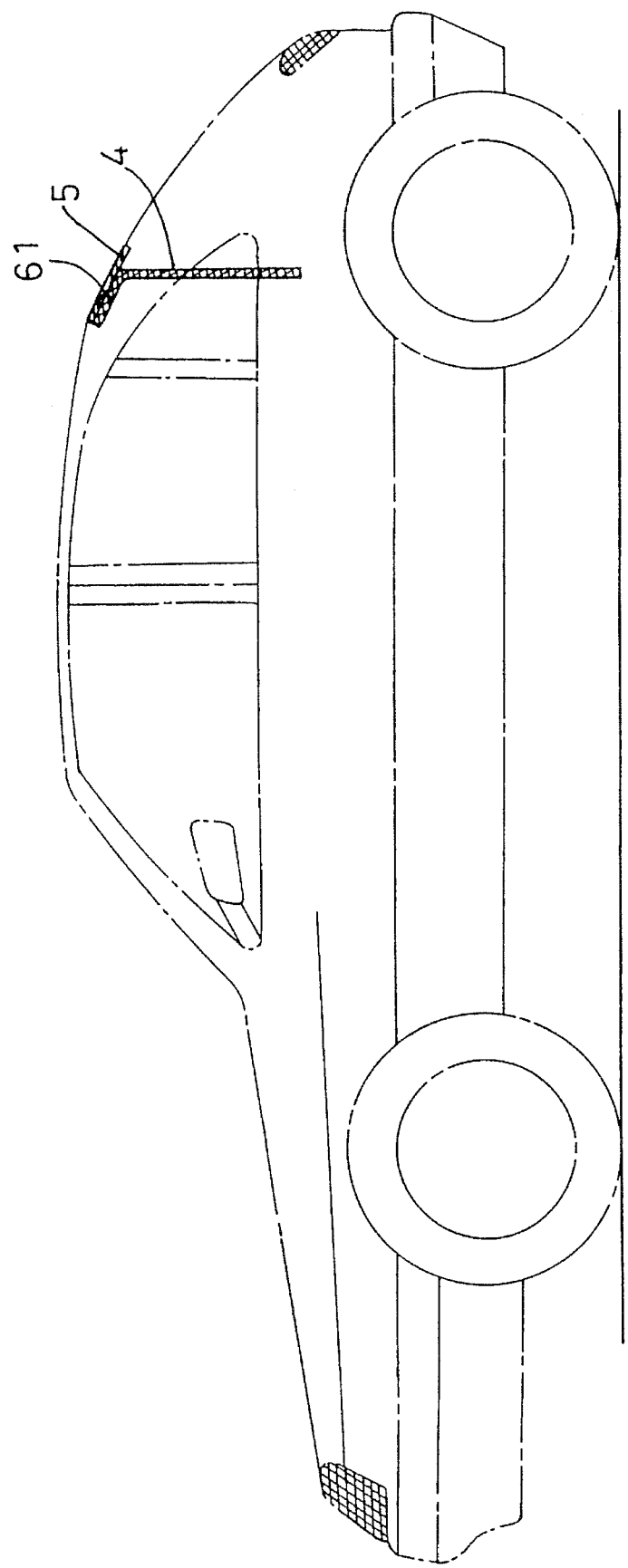
FIG. 6 shows the sunshielding curtain of the present invention when in use.

In use, the pressure sensitive adhesive sheet 5 is pressed against the glass panel of a vehicle, as shown in FIG. 6. The concave portions 61, 62, 63 function as suction cups and form vacuum spaces with the glass panel, thereby securing effectively the pressure sensitive adhesive sheet 5 to the glass panel. The suction force generated by the sunshielding curtain of the present invention is therefore equivalent to that of a plurality of suction cups. Since the sizes of each of the concave portions 61, 62, 63 are different from one another, the effective suction areas 612, 622 overlap with one another, thereby further strengthening the suction force of the concaved portions 61, 62, 63.

In the preferred embodiment, each of the pressure sensitive sheets 5 is attached to a respective distal peripheral edge of the sunshielding sheet 4. The two pressure sensitive sheets 5 cooperatively provide sufficient sticking power to adhere on the sunshielding curtain glass panel of the vehicle window while bearing the overall weight of the sunshielding sheet 4. Thus, the sunshielding curtain of the present invention does not easily fall from the adhered surface unlike the prior art.

With this invention thus explained, it is apparent that numerous modifications and variations can be made without departing from the scope and spirit of this invention. It is therefore intended that this invention be limited only as in the appended claims.

I claim:

1. A sunshielding curtain including a sunshielding sheet and a pressure sensitive adhesive sheet attached to said sunshielding sheet and having an interior face lying against said sunshielding sheet and an exterior face opposite to said interior face, wherein said pressure sensitive adhesive sheet has a plurality of separate concave portions integrally formed on said exterior face, each of said concave portions being surrounded by substantially planar portions of said adhesive sheet, and said interior face is fixed to said sunshielding sheet at positions corresponding to said separate concave portions, and said interior face of said sheet in the area corresponding to said planar portions is unattached to said sunshielding sheet.

2. The sunshielding curtain as defined in claim 1, wherein said pressure sensitive adhesive sheet is made of plastic and is heat-pressed from said exterior face thereof so as to stick on said sunshielding sheet and so as to form said concave portions on said exterior face.

3. A sunshielding curtain including a sunshielding sheet and at least a strip of pressure sensitive adhesive sheet attached along an edge of said sunshielding sheet and having an interior face lying against said sunshielding sheet and an exterior face opposite to said interior face, wherein said pressure sensitive adhesive sheet has a plurality of separate concave portions integrally formed on said exterior face, each of said concave portions being surrounded by substantially planar portions of said strip, said interior face is fixed to said sunshielding sheet at positions corresponding to said separate concave portions, and said interior face of said strip in the area corresponding to said planar portions is unattached to said sunshielding sheet.

4. The sunshielding curtain as defined in claim 3, wherein said pressure sensitive adhesive sheet has a central line parallel to said edge of said sunshielding sheet, said concave portions being aligned along said central line such that adjacent ones of said concave portions are displaced at a certain interval.

5. The sunshielding curtain as defined in claim 3, wherein said pressure sensitive adhesive sheet is made of plastic and is heat-pressed from said exterior face thereof so as to stick on said sunshielding sheet and so as to form said concave portions on said exterior face.

6. The sunshielding curtain as defined in claim 4, wherein said pressure sensitive adhesive sheet is made of plastic and is heat-pressed from said exterior face thereof so as to stick on said sunshielding sheet and so as to form said concave portions on said exterior face.

* * * * *